(12) United States Patent
Yoo et al.

(10) Patent No.: US 10,700,632 B1
(45) Date of Patent: Jun. 30, 2020

(54) METHOD FOR MOTOR AND INVERTER TEMPERATURE CONTROL

(71) Applicant: GM Global Technology Operations LLC, Detroit, MI (US)

(72) Inventors: Anno Yoo, Rochester, MI (US); Yo Chan Son, Rochester Hills, MI (US); Dwarakanath V. Simili, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/245,402

(22) Filed: Jan. 11, 2019

(51) Int. Cl.
  *H02P 29/68* (2016.01)
  *H02P 21/14* (2016.01)
  *B60L 3/06* (2006.01)

(52) U.S. Cl.
  CPC .............. *H02P 29/68* (2016.02); *B60L 3/06* (2013.01); *H02P 21/14* (2013.01); *B60L 2240/421* (2013.01); *B60L 2240/423* (2013.01); *B60L 2240/425* (2013.01)

(58) Field of Classification Search
  CPC ..................................................... H02P 29/68
  USPC ................................................. 318/432, 430
  See application file for complete search history.

(56) References Cited

U.S. PATENT DOCUMENTS

| | | | |
|---|---|---|---|
| 7,615,951 B2 | 11/2009 | Son et al. | |
| 7,755,313 B2 | 7/2010 | Son et al. | |
| 8,040,083 B2* | 10/2011 | Okamura | B60L 58/27 318/139 |
| 8,482,237 B2 | 7/2013 | Berry et al. | |
| 9,312,685 B2* | 4/2016 | Kinouchi | B60W 10/08 |
| 9,356,551 B2 | 5/2016 | Berry et al. | |

\* cited by examiner

*Primary Examiner* — David Luo

(57) ABSTRACT

An electric motor control system of a vehicle includes a temperature module configured to, based on a motor torque request, (i) determine a plurality of stator current values based on a plurality of temperatures and (ii) generate a maximum stator current based on a lowest value of the plurality of stator current values. A torque module configured to, based on the maximum stator current, the motor torque request, and a maximum allowable flux, generate a maximum torque output. A current command module configured to, based on a speed of a rotor of the electric motor and the maximum torque output, generate a d-axis current adjustment and a q-axis current adjustment. A switching control module configured to, based on the B- and q-axis current adjustments, control switching of an inverter module and apply power to stator windings of the electric motor from an energy storage device.

20 Claims, 8 Drawing Sheets

METHOD FOR MOTOR AND INVERTER TEMPERATURE CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling an electric motor of a vehicle based on temperatures of one or more components of the electric motor.

Some types of vehicles include only an internal combustion engine that generates propulsion torque. Non-hybrid electric vehicles may include one or more electric motors. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In an electric motor control system of a vehicle is described. A temperature module is configured to, based on a motor torque request for an electric motor of the vehicle, (i) determine a plurality of stator current values based on a plurality of temperatures and (ii) generate a maximum stator current based on a lowest value of the plurality of stator current values. A torque module is configured to, based on the maximum stator current, the motor torque request, and a maximum allowable flux, generate a maximum torque output. A current command module is configured to, based on a speed of a rotor of the electric motor and the maximum torque output, generate a d-axis current adjustment and a q-axis current adjustment. A switching control module is configured to, based on the d-axis current adjustment and the q-axis current adjustment, control switching of an inverter module and apply power to stator windings of the electric motor from an energy storage device. The plurality of temperatures correspond to at least one temperature associated with the electric motor and at least one temperature associated with the inverter module.

In further features, the temperature module includes a plurality of controllers; and each of the plurality of controllers includes: a temperature error module that is configured to output an error signal corresponding to a difference between a temperature reference and a measured temperature; and a proportional integral module, is connected to the temperature error module, that is configured to output a first signal and a second signal, where the first signal is a first multiplication product of the error signal and the second signal is based on at least one of an integral of the error signal and a second multiplication product of the error signal.

In further features, each of the plurality of controllers further includes a feed-forward module, is connected to the proportional integral module, and outputs the maximum stator current based on the first signal, the second signal, and a feed-forward current value.

In further features, each of the plurality of controllers includes a limiting module, to which an output of the feed-forward module is input, configured to: in response to the maximum stator current being greater than a first predetermined current, output the first predetermined current; and in response to the maximum stator current being less than the first predetermined current, output the maximum stator current, where the first predetermined current is less than the maximum stator current.

In further features, the proportional integral module includes a proportional portion and an integral portion; each of the plurality of controllers includes a comparison module that is configured to determine a difference between an output of the limiting module and an input of the limiting module; in response to the difference not being equal to a first predetermined value, setting an input to the integral portion to a second predetermined value; and in response to the difference being equal to the first predetermined value, setting the input to the integral portion to the difference between the temperature reference and the measured temperature.

In further features, the at least one temperature associated with the electric motor is at least one of a temperature of the rotor and a temperature of the stator windings of the electric motor; and the plurality of controllers includes a stator controller, a rotor controller, a diode controller, and an IGBT controller.

In further features, the feed-forward current value is set by a power margin module that determines the feed-forward current value based on a thermal model of the electric motor.

In further features, the inverter module includes at least one diode and at least one insulated gate bipolar transistor; and the at least one temperature associated with the inverter module is associated with the at least one diode.

In further features, the feed-forward current term is based on a switching loss of the at least one diode and a conduction loss of the at least one diode.

In further features, the at least one temperature associated with the inverter module is associated with the at least one insulated gate bipolar transistor; and the feed-forward current value is based on a switching loss of the at least one insulated gate bipolar transistor and a conduction loss of the at least one insulated gate bipolar transistor.

In a feature, an electric motor control method for a vehicle includes: in response to receiving a motor torque request for an electric motor of the vehicle: determining, with a temperature module, a plurality of stator current values based on a plurality of temperatures; and generating, with the temperature module, a maximum stator current based on a lowest value of the plurality of stator current values. The method further includes generating, with a torque module, a maximum torque output based on the maximum stator current, the motor torque request, and a maximum allowable flux. The method further includes generating, with a current command module, a d-axis current adjustment and a q-axis current adjustment based on a speed of a rotor of the electric motor and the maximum torque output. The method further includes controlling, with a switching control module, switching of an inverter module and applying power to stator windings of the electric motor from an energy storage device, where the plurality of temperatures correspond to at least one temperature associated with the electric motor and at least one temperature associated with the inverter module.

In further features, the temperature module includes a plurality of controllers and determining the plurality of stator current values includes: generating, for each of the plurality of controllers, an error signal corresponding to a difference between a temperature reference and a measured temperature; and generating, for each of the plurality of controllers, a first signal and a second signal, where the first signal is a first multiplication product of the error signal and the second signal is based on at least one of an integral of the error signal and a second multiplication product of the error signal.

In further features, determining the plurality of stator current values includes: generating, for each of the plurality of controllers, a feed-forward current value; and generating, for each of the plurality of controllers, the maximum stator current based on the first signal, the second signal, and the feed-forward current value.

In further features, each of the plurality of controllers includes a limiting module and determining the plurality of stator current values includes: outputting, for each of the plurality of controllers, a first predetermined current in response to the maximum stator current being greater than the first predetermined current; and outputting, for each of the plurality of controllers, the maximum stator current in response to the maximum stator current being less than the first predetermined current, where the first predetermined current is less than the maximum stator current.

In further features, determining the plurality of stator current values includes: determining, for each of the plurality of controllers, a difference between an output of the controller and the maximum stator current; in response to the difference not being equal to a first predetermined value, setting an input to an integral portion of each of the plurality of controllers to a second predetermined value; and in response to the difference being equal to the first predetermined value, setting the input to the integral portion of each of the plurality of controllers to the difference between the temperature reference and the measured temperature.

In further features, the at least one temperature associated with the electric motor is at least one of a temperature of the rotor and a temperature of the stator windings of the electric motor.

In further features, the feed-forward current value is based on a thermal model of the electric motor.

In further features, the inverter module includes at least one diode and at least one insulated gate bipolar transistor; and the at least one temperature associated with the inverter module is associated with the at least one diode.

In further features, the feed-forward current value is based on a switching loss of the at least one diode and a conduction loss of the at least one diode.

In further features, the at least one temperature associated with the inverter module is associated with the at least one insulated gate bipolar transistor; and the feed-forward current value is based on a switching loss of the at least one insulated gate bipolar transistor and a conduction loss of the at least one insulated gate bipolar transistor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts air and fuel within cylinders to generate propulsion torque. The engine outputs torque to wheels of the vehicle via a transmission. Some types of vehicles may not include an internal combustion engine or the internal combustion engine may not be mechanically coupled to a driveline of the vehicle.

In a hybrid or non-hybrid electric vehicle, an electric motor is mechanically coupled to a shaft of the transmission. A motor control module may apply power to the electric motor from a battery to cause the electric motor to output torque for vehicle propulsion. In a hybrid vehicle, under some circumstances, the motor control module may disable power flow to the electric motor and allow the transmission to drive rotation of the electric motor. The electric motor generates power when driven by the transmission. Power generated by the electric motor can be used to recharge the battery when a voltage generated via the electric motor is greater than a voltage of the battery.

The motor control module determines a d-axis current command and a q-axis current command for the electric motor based on a requested torque output of the electric motor. Torque output of the electric motor, however, may vary with temperatures of components of the electric motor (e.g., a rotor and stator) and an inverter (e.g., an insulated gate bipolar transistor (IGBT) and an inverter diode). For example, torque output of the electric motor may decrease as respective temperatures of the rotor, the stator, the IGBT, and the inverter diode increase and vice versa.

According to the present disclosure, the motor control module selectively adjusts at least one of the d-axis current command and the q-axis current command based on electric motor and inverter temperatures. For example, a maximum allowable torque may vary due to temperature derating to prevent motor or inverter overheating, and the motor control module adjusts the current commands in accordance with the maximum allowable torque. The motor control module maximizes torque output by calculating and adjusting the maximum allowable torque based on the temperatures of the rotor, stator, IGBT, and inverter diode and a flux magnitude (e.g., corresponding to a voltage limit).

Figure 1:
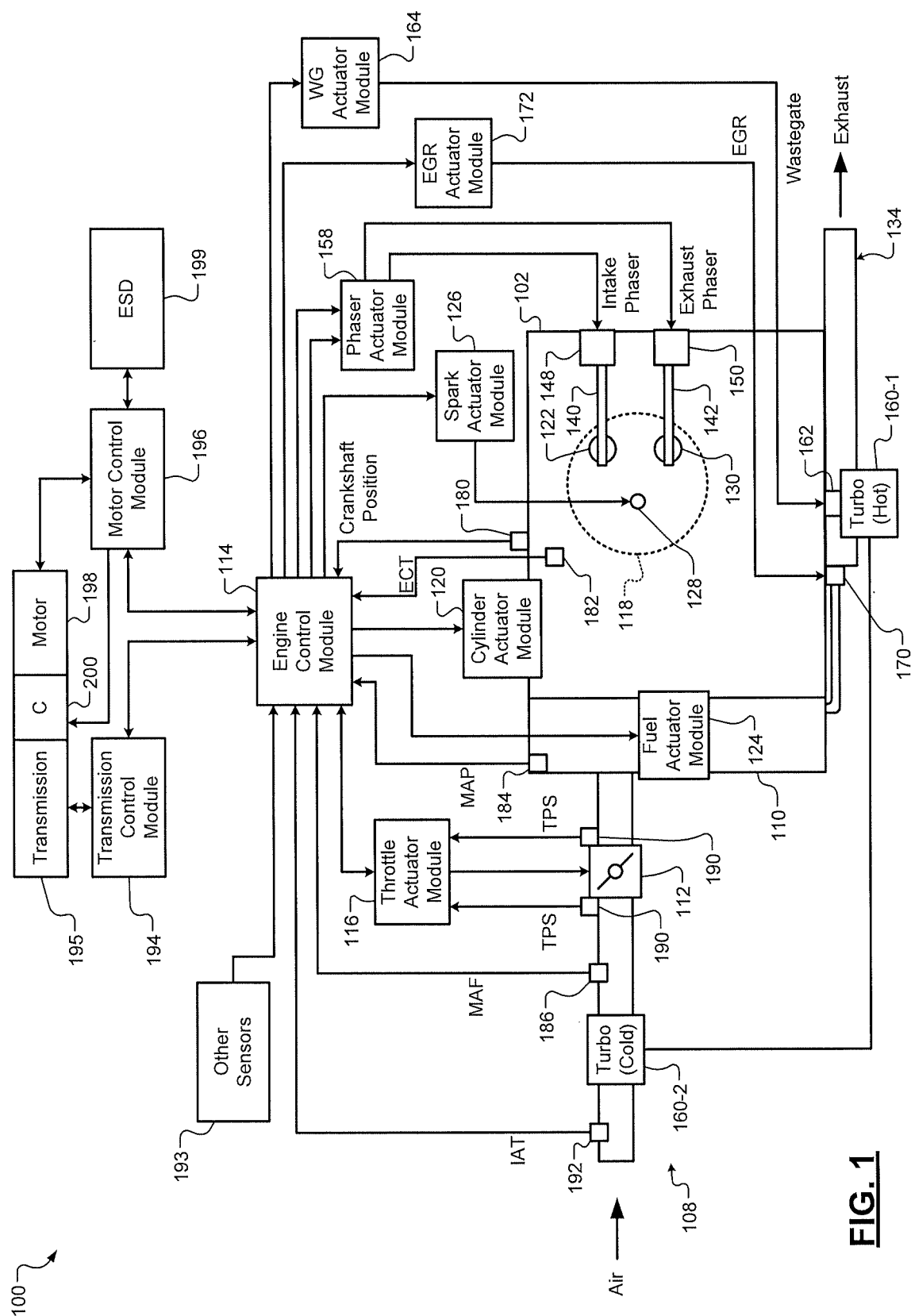
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogeneous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottommost position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed.

Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. Engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. Temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a motor control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the motor control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the motor control module 196 controls the electric motor 198 to output torque, for example, to supplement engine torque output. The motor control module 196 may also control the electric motor 198 to output torque for vehicle propulsion at times when the engine 102 is shut down.

The motor control module 196 applies electrical power from an energy storage device (ESD) 199 to the electric motor 198 to cause the electric motor 198 to output positive torque. The ESD 199 may include, for example, one or more batteries. The ESD 199 may be dedicated for power flow to and from the electric motor 198, and one or more other batteries or energy storage devices may supply power for other vehicle functions.

The electric motor 198 may output torque, for example, to an input shaft of the transmission 195 or to an output shaft of the transmission 195. A clutch 200 is engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the ESD 199. The motor control module 196 may charge the ESD 199 via the power output by the electric motor 198. This may be referred to as regeneration.

Figure 2:
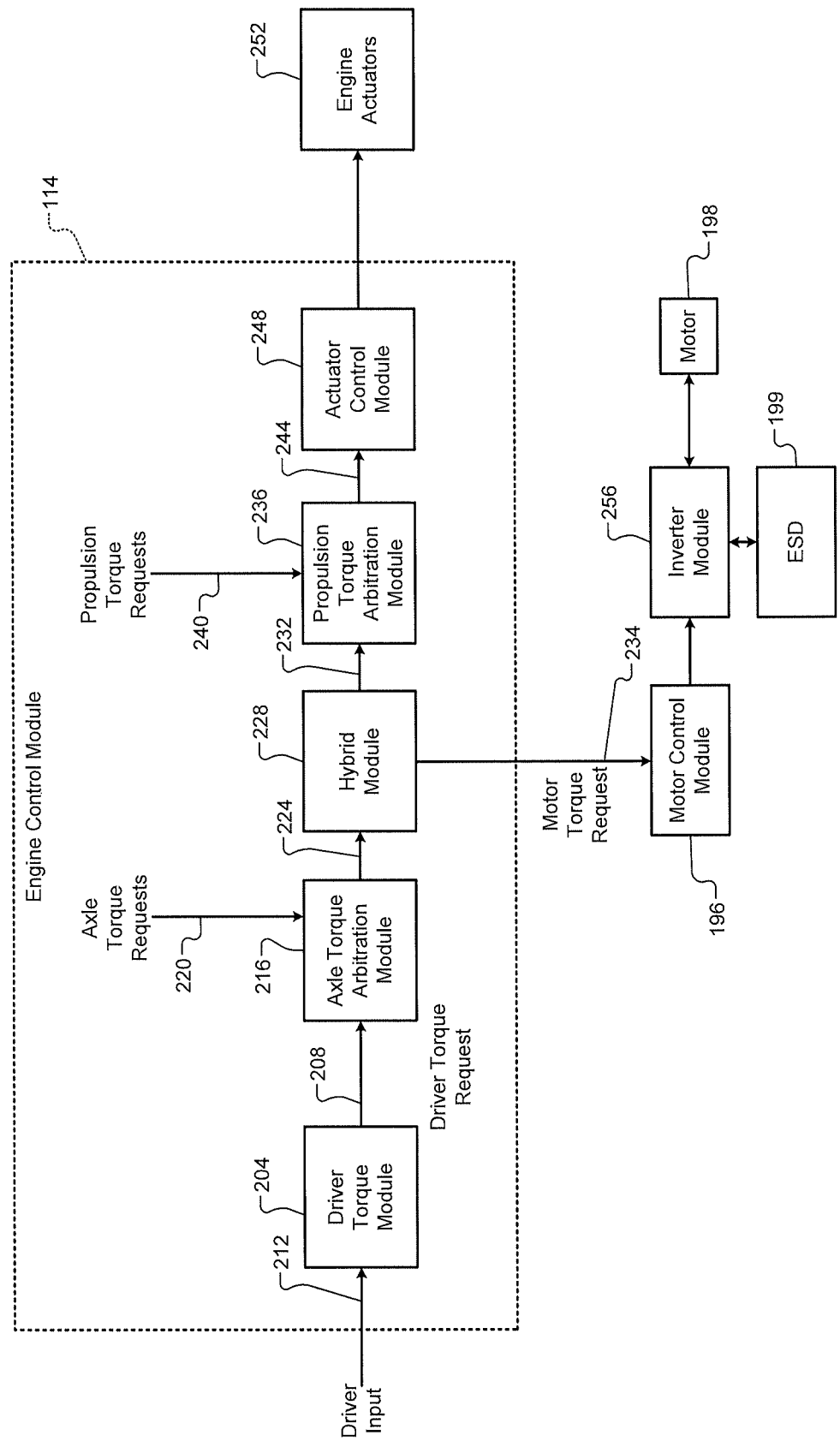
FIG. 2 is a functional block diagram of an example engine and motor control system.

Referring now to FIG. 2, a functional block diagram of an example engine control system is presented. The ECM 114 includes a driver torque module 204 that determines a driver torque request 208 based on driver input 212. The driver input 212 may include, for example, an accelerator pedal position (APP), a brake pedal position (BPP), and/or cruise control input. In various implementations, the cruise control input may be provided by an adaptive cruise control system that attempts to maintain at least a predetermined distance between the vehicle and objects in a path of the vehicle. The driver torque module 204 determines the driver torque request 208 based on one or more lookup tables that relate the driver inputs to driver torque requests. The APP and BPP may be measured using one or more APP sensors and BPP sensors, respectively.

The driver torque request 208 is an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 220 and 224.

In examples where the vehicle is a hybrid vehicle, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102. The hybrid module 228 also outputs a motor torque request 234 to the motor control module 196. The motor torque request 234 indicates a requested torque output (positive or negative) of the electric motor 198. In vehicles where the engine 102 is omitted or is not connected to output propulsion torque for the vehicle, the axle torque arbitration module 216 may output one axle torque request and the motor torque request 234 may be equal to that axle torque request.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. Based on the propulsion torque requests 244, the actuator control module 248 may control opening of the throttle valve 112, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of the EGR valve 170, and/or one or more other engine actuators. In various implementations, the propulsion torque requests 244 may be adjusted or modified before use by the actuator control module 248, such as to create a torque reserve.

The motor control module 196 controls switching of an inverter module 256 based on the motor torque request 234. Switching of the inverter module 256 controls power flow from the ESD 199 to the electric motor 198. As such, switching of the inverter module 256 controls torque of the electric motor 198. The inverter module 256 also converts power generated by the electric motor 198 and outputs power to the ESD 199, for example, to charge the ESD 199.

The inverter module 256 includes a plurality of switches. The switches are switched to convert DC power from the ESD 199 into alternating current (AC) power and apply the AC power to the electric motor 198 to drive the electric motor 198. For example, the inverter module 256 may convert the DC power from the ESD 199 into 3-phase AC power and apply the 3-phase AC power to (e.g., a, b, and c or u, v, and w) stator windings of the electric motor 198. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the ESD 199. The one or more filters may be implemented, for example, to filter power flow to and from the ESD 199. As an example, a filter including one or more capacitors and resistors may be electrically connected in parallel with the inverter module 256 and the ESD 199.

Figure 3:
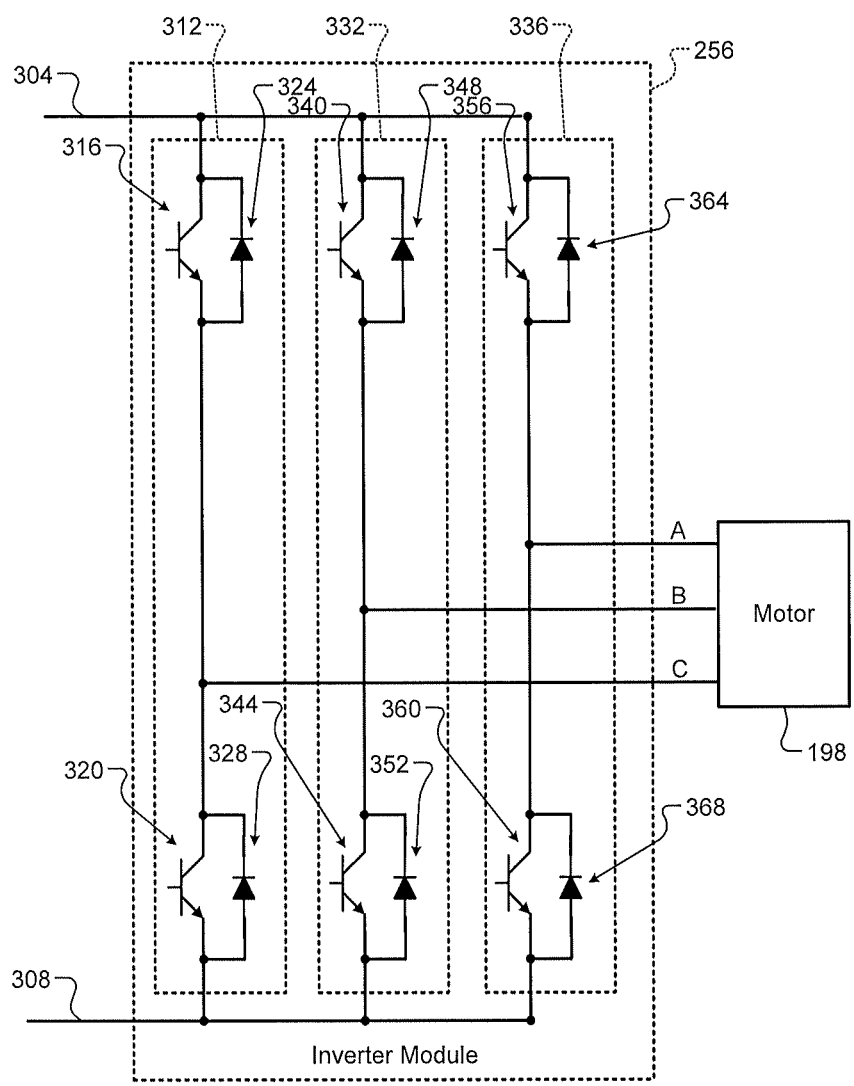
FIG. 3 is a schematic including an example implementation of an inverter module.

FIG. 3 shows a schematic including an example implementation of the inverter module 256. High (positive) and low (negative) sides 304 and 308 are connected to positive and negative terminals, respectively, of the ESD 199. The inverter module 256 is also connected between the high and low sides 304 and 308.

The inverter module 256 includes three legs (one leg connected to each phase of the electric motor 198). A first leg 312 includes first and second switches 316 and 320. The switches 316 and 320 each include a first terminal, a second terminal, and a control terminal. Each of the switches 316 and 320 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 316 is connected to the high side 304. The second terminal of the first switch 316 is connected to the first terminal of the second switch 320. The second terminal of the second switch 320 may be connected to the low side 308. A node connected to the second terminal of the first switch 316 and the first terminal of the second switch 320 is connected to a first phase (e.g., a) of the electric motor 198.

The first leg 312 also includes first and second diodes 324 and 328 connected anti-parallel to the switches 316 and 320, respectively. In other words, an anode of the first diode 324 is connected to the second terminal of the first switch 316, and a cathode of the first diode 324 is connected to the first terminal of the first switch 316. An anode of the second diode 328 is connected to the second terminal of the second switch 320, and a cathode of the second diode 328 is connected to the first terminal of the second switch 320. When the switches 316 and 320 are off (and open), power generated by the electric motor 198 is transferred through the diodes 324 and 328 when the output voltage of the electric motor 198 is greater than the voltage of the ESD 199. This charges the ESD 199. The diodes 324 and 328 form one phase of a three-phase rectifier.

The inverter module 256 also includes second and third legs 332 and 336. The second and third legs 332 and 336 may be (circuitry wise) similar or identical to the first leg 312. In other words, the second and third legs 332 and 336 may each include respective switches and diodes like the switches 316 and 320 and the diodes 324 and 328, connected in the same manner as the first leg 312. For example, the second leg 332 includes switches 340 and 344 and anti-parallel diodes 348 and 352. A node connected to the second terminal of the switch 340 and the first terminal of the switch 344 is connected to a second stator winding (e.g., b) of the electric motor 198. The third leg 336 includes switches 356 and 360 and anti-parallel diodes 364 and 368. A node connected to the second terminal of the switch 356 and the first terminal of the switch 360 is connected to a third stator winding (e.g., c) of the electric motor 198.

Figure 4:
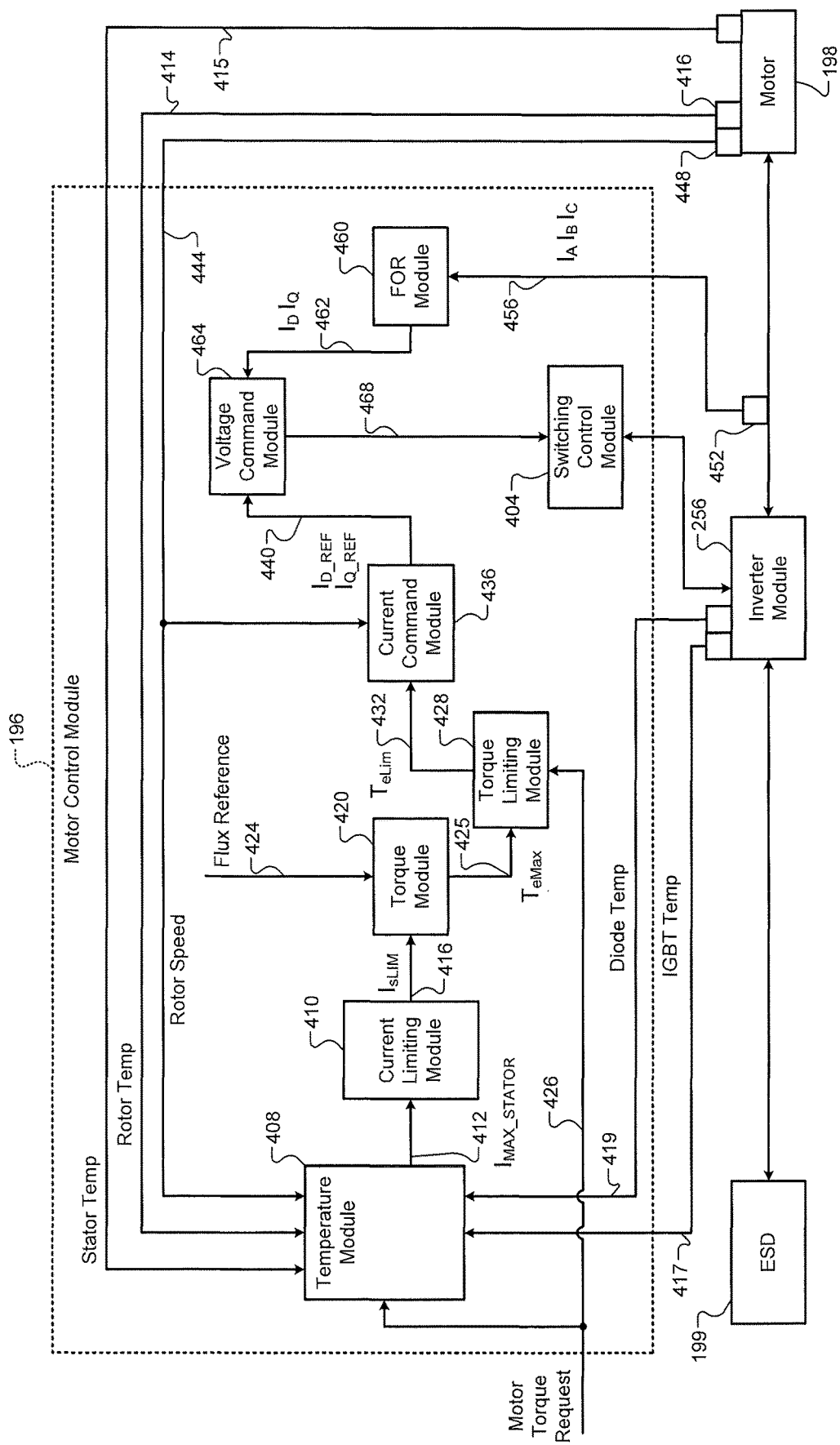
FIG. 4 is a functional block diagram including an example implementation of a motor control module.

FIG. 4 is a functional block diagram including an example implementation of the motor control module 196. A switching control module 404 controls switching of the switches 316 and 320 using pulse width modulation (PWM) signals. For example, the switching control module 404 may apply PWM signals to the control terminals of the switches 316, 320, 340, 344, 356, and 360. When on, power flows from the ESD 199 to the electric motor 198 to drive the electric motor 198.

For example, the switching control module 404 may apply generally complementary PWM signals to the control terminals of the switches 316 and 320 when applying power from the ESD 199 to the electric motor 198. In other words, the PWM signal applied to the control terminal of the first switch 316 is opposite in polarity to the PWM signal applied to the control terminal of the second switch 320. Short circuit current may flow, however, when the turning on of one of the switches 316 and 320 overlaps with the turning off of the other of the switches 316 and 320. As such, the switching control module 404 may generate the PWM signals to turn both of the switches 316 and 320 off during a dead time period before turning either one of the switches 316 and 320 on. With this in mind, generally complementary may mean that two signals have opposite polarities for a majority of their periods when power is being output to the electric motor 198. Around transitions, however, both PWM signals may have the same polarity (off) for some overlap dead time period.

The PWM signals provided to the switches of the second and third legs 332 and 336 may also be generally complementary per leg. The PWM signals provided to the second and third legs 332 and 336 may be phase shifted from each other and from the PWM signals provided to the switches 316 and 320 of the first leg 312. For example, the PWM signals for each leg may be phase shifted from each other leg by 120° (360°/3 legs=120° shift per leg). In this way, the currents through the stator windings (phases) of the electric motor 198 are phase shifted by 120° from each other.

A temperature module 408 determines a maximum stator current ($I_{MAX\_STATOR}$) 412 based on one or more components of the electric motor 198 or the inverter module 256. For example, a stator temperature 415, a rotor temperature 414, an IGBT temperature 417, and a diode temperature 419 are provided to the temperature module 408. The stator temperature 415 and the rotor temperature 414 may be estimated based on a motor temperature estimation model such as described in greater detail in FIG. 7. Alternately, the stator temperature 415, the rotor temperature 414, the IGBT temperature 417, and the diode temperature 419 may be measured by one or more sensors such as a rotor temperature sensor 416.

A current limiting module 410 limits the maximum stator current ($I_{MAX\_STATOR}$) 412 to a limited maximum stator current (Ism) 416. The limited maximum stator current (Ism) 416 may be limited to within a predetermined maximum current range bounded by a predetermined minimum current (e.g., 0). A torque module 420 determines a maximum allowable torque ($T_{eMAX}$). For example, the torque module 420 may determine a maximum torque ($T_{eMAX}$) 425 from a look-up table based on the limited maximum stator current ($I_{sLIM}$) 416 and a flux reference 424. The flux reference 424 may be a predetermined flux reference or calibrated flux value that is based on a ratio between the DC bus voltage ($V_{DC}$) and the operating speed of the motor.

A torque limiting module 428 compares the maximum torque ($T_{eMAX}$) 425 to a motor torque request 234. If the motor torque request 234 is greater than the maximum torque ($T_{eMAX}$) 425, the torque limiting module 428 outputs the maximum torque ($T_{eMAX}$) 425 as a limited maximum torque ($T_{eLIM}$) 432. If the motor torque request 234 is less than the maximum torque ($T_{eMAX}$) 425, the torque limiting module 428 outputs the motor torque request 234 as the limited maximum torque ($T_{eLIM}$) 432.

A current command module 436 determines a d-axis current command ($I_{D\_REF}$) and a q-axis current command ($I_{Q\_REF}$) for the electric motor 198. The d-axis current command ($I_{D\_REF}$) and the q-axis current command ($I_{Q\_REF}$) are collectively illustrated by 440. The current command module 436 determines the d-axis current command ($I_{D\_REF}$) and the q-axis current command ($I_{Q\_REF}$) using one or more equations and/or lookup tables that relate torques (e.g., torque requests or commands), the rotor speed 444, to the d-axis current command ($I_{D\_REF}$) and the q-axis current command ($I_{Q\_REF}$).

The rotor speed 444 is a rotational speed of the rotor of the electric motor 198. The rotor speed 444 may be measured, for example, using a rotor speed sensor 448. In various implementations, the rotor speed 444 may be determined by a rotor speed module based on one or more other parameters, such change in position of the rotor over time where position is determined based on currents (e.g., $I_A$, $I_C$, $I_C$) 456 flow through the stator windings of the electric motor 198. Current sensors 452 may measure the currents 456.

A frame of reference (FOR) module 460 receives the currents (e.g., $I_A$, $I_C$, $I_C$) 456 from the current sensors 452. The FOR module 460 may transform the currents (e.g., $I_A$, $I_C$, $I_C$) 456 into the d and q-axis currents by applying a Clarke transform and a Park transform. A voltage command module 464 determines voltage commands 468 for voltages to apply to the stator windings based on the d-axis and q-axis current commands ($I_{D\_REF}$ and $I_{Q\_REF}$) 440 and the d and q-axis currents ($I_D$ and $I_Q$) 462. The voltage command module 464 may determine the voltage commands 468 using one or more equations and/or lookup tables that relate d and q axis current commands ($I_{D\_REF}$ and $I_{Q\_REF}$) 440 and d and q-axis currents ($I_D$ and $I_Q$) 462 to the voltage commands 468. In various implementations, the voltage command module 464 may generate the voltage commands 468 using closed-loop control to adjust the d and q-axis currents ($I_D$ and $I_Q$) 462 toward the d and q-axis current commands ($I_{D\_REF}$ and $I_{Q\_REF}$) 440.

The switching control module 404 determines duty cycles of the PWM signals to apply to the stator windings based on the respective voltage commands 468 for the stator windings. For example, the switching control module 404 may determine the duty cycles using one or more equations or lookup tables that relate voltage commands to PWM duty cycles.

Torque output of the electric motor 198, however, varies as a temperature of one or more components of the electric motor 198 or one or more components of the inverter module 256 varies. For example, under the same conditions, torque output of the electric motor 198 may decrease as the temperature of the rotor increases and vice versa. The relationship between the rotor temperature 414 and torque output may be linear or non-linear.

Figure 5:
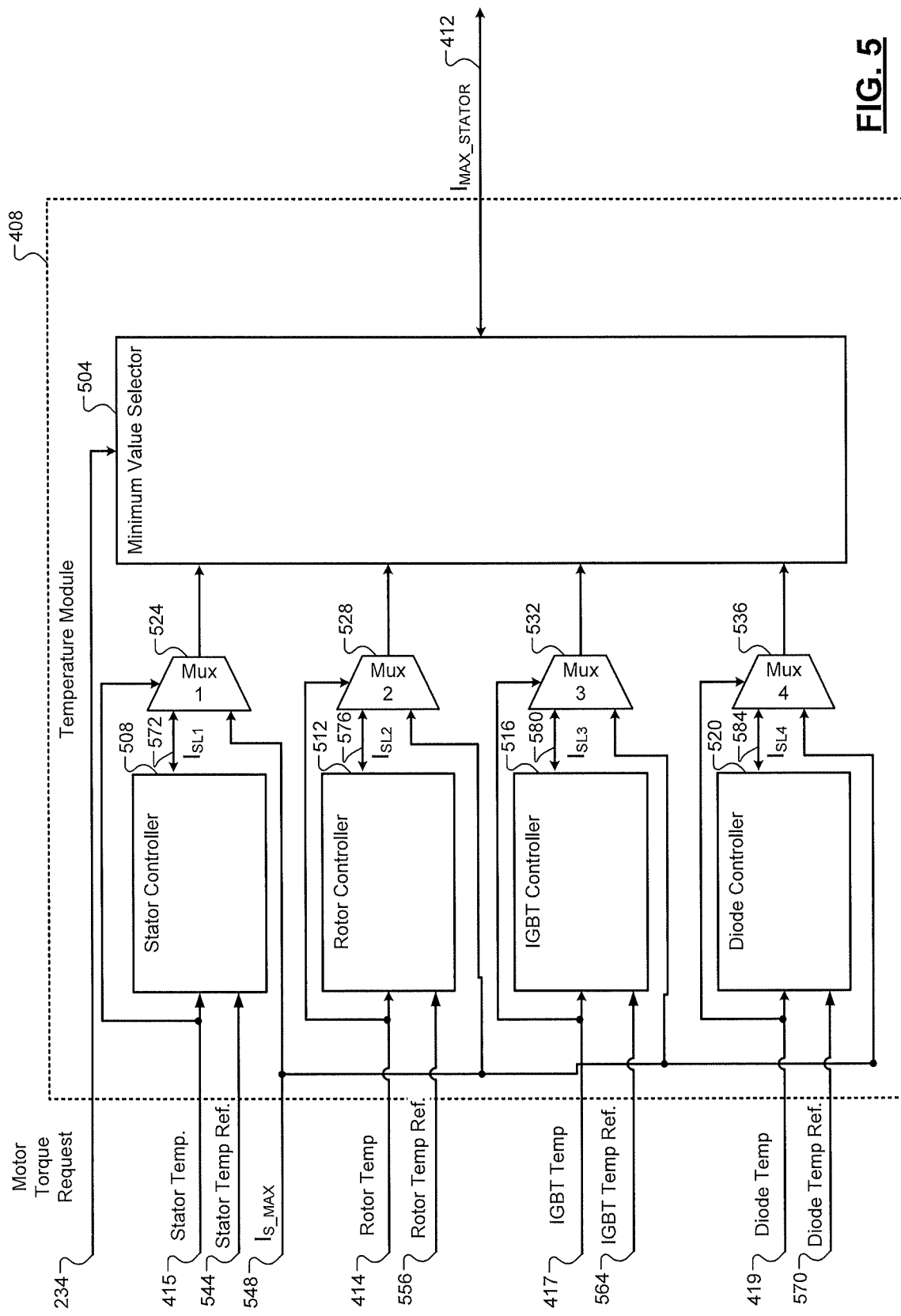
FIG. 5 is an example implementation of a temperature module.

FIG. 5 is an example implementation of the temperature module 408. The temperature module 408 includes a plurality of controllers, a plurality of multiplexors, and a minimum value selector 504. The plurality of controllers includes a stator controller 508, a rotor controller 512, an IGBT controller 516, and a diode controller 520. The plurality of multiplexors includes a first multiplexor 524, a second multiplexor 528, a third multiplexor 532, and a fourth multiplexor 536.

The first multiplexor 524 determines whether to input the first limited maximum stator current ($I_{SL1}$) 572 or a predetermined maximum stator current ($I_{S\_MAX}$) 548 to the minimum value selector 504 based on the stator temperature 415. The predetermined maximum stator current ($I_{S\_MAX}$) 548 may be a predetermined value or a calibrated value. For example, when the stator temperature 415 is not available, the first multiplexor 524 may select the predetermined maximum stator current ($I_{S\_MAX}$) 548 as an input to the minimum value selector 504. When the stator temperature 415 is available, the first multiplexor 524 may select the first limited maximum stator current ($I_{SL1}$) 572 as an input to the minimum value selector 504 ($I_{S\_MAX}$) is only used when the stator temperature is not available).

Figure 6:
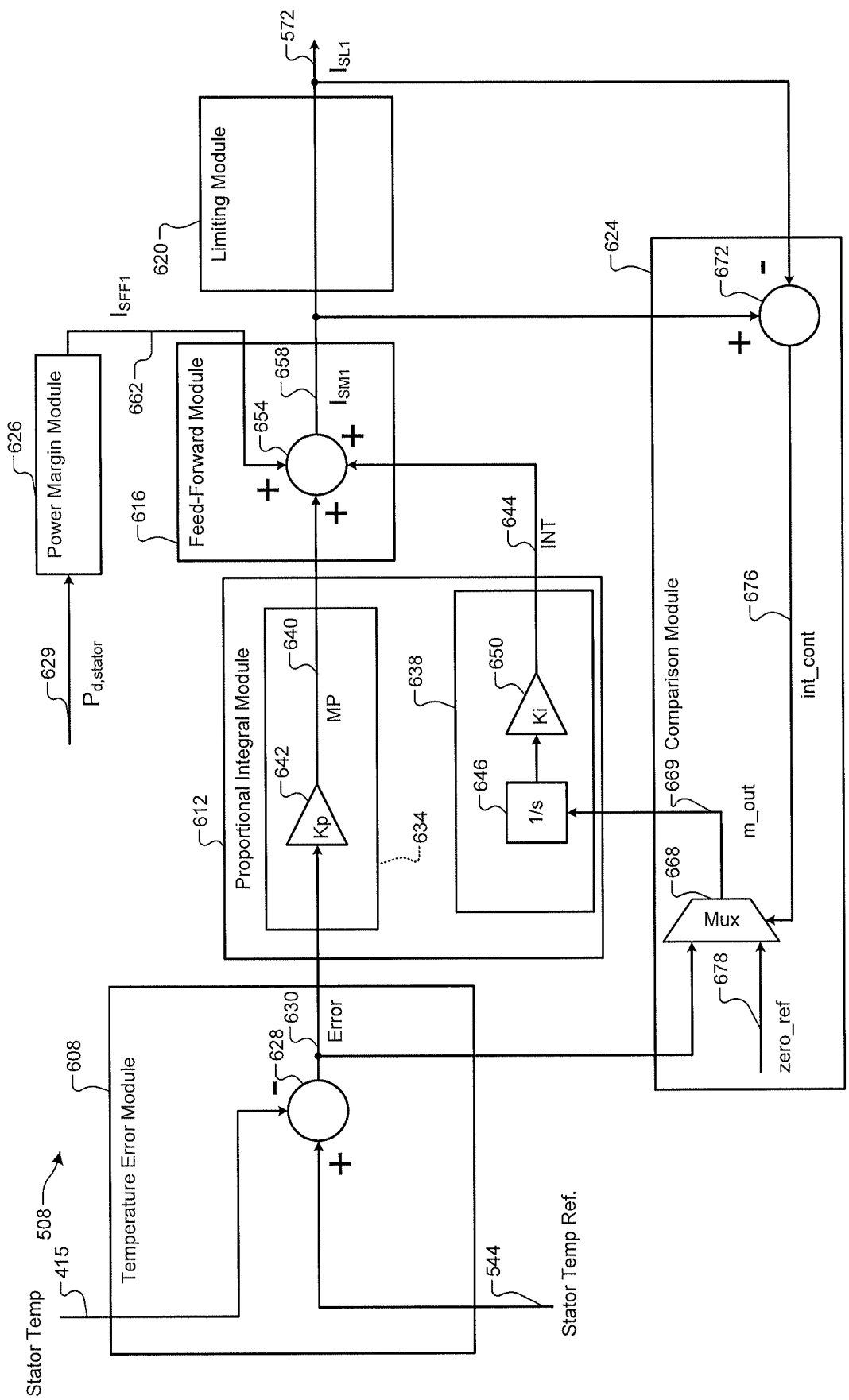
FIG. 6 is a functional block diagram including an example implementation of a stator controller.

FIG. 6 is a functional block diagram including an example implementation of the stator controller 508. The stator controller 508 outputs the first limited maximum stator current ($I_{SL1}$) 572 to the first multiplexor 524 based on the stator temperature 415. The stator controller 508 includes a temperature error module 608, a proportional integral (PI) module 612, a feed-forward module 616, a limiting module 620, a comparison module 624, and a power margin module 626. The temperature error module 608 includes a summation junction 628 that outputs an error signal 630 corresponding to the difference between the stator temperature 415 and the stator temperature reference signal 544.

The PI module 612 includes a proportional portion 634 and an integral portion 638. The proportional portion 634 includes a gain module 642 that outputs a multiplication product (MP) 640 of the error signal 630. The integral portion 638 outputs an integral signal (INT) 644 based on an integral module 646, a gain module 650, and the error signal 630. The feed-forward module 616 includes a summation junction 654 that outputs a first maximum stator current ($I_{SM1}$) 658 based on the outputs of the PI module 612 and a first feed-forward stator current ($I_{SFF1}$) 662. The first feed-forward stator current ($I_{SFF1}$) 662 is set by the power margin module 626 (described in greater detail with respect to FIG. 7).

The limiting module 620 limits the first maximum stator current ($I_{SM1}$) 658 to the first limited maximum stator current ($I_{SL1}$) 572. The first limited maximum stator current ($I_{SL1}$) 572 may be limited between an upper predetermined current limit and a lower predetermined current limit. The comparison module 624 includes a multiplexor 668 and a summation junction 672 that outputs an integral control signal (int_cont) 676 based on the absolute value of the difference between the limited maximum stator current ($I_{SL1}$) 572 and the first maximum stator current ($I_{SM1}$) 658.

Based on the integral control signal (int_cont) 676, the multiplexor 668 will either set the input to the integral portion 638 to a zero reference signal (zero_ref) 678 or to the error signal 630. In this manner, integral windup and temperature overshoot can be prevented. For example, when the integral control signal (int_cont) 676 is greater than zero, the multiplexor 668 may set the input to the integral portion 638 to zero (i.e., the first maximum stator current ($I_{SM1}$) 658 is not equal to the first limited maximum stator current ($I_{SL1}$) 572) with a multiplexor output signal (m_out) 669. If the error signal 630 is equal to zero (i.e., the first maximum stator current ($I_{SM1}$) 658 is equal the first limited maximum stator current ($I_{SL1}$) 572), the multiplexor may set, with the mux output signal (m_out) 669, the error signal 630 as an input to the integral portion 638.

With reference back to FIG. 5, the rotor controller 512 outputs a second limited maximum stator current ($I_{SL2}$) 576 based on the rotor temperature 414 and a rotor temperature reference signal 556. The IGBT controller 516 outputs a third limited maximum stator current ($I_{SL3}$) 580 based on the IGBT temperature 417 and an IGBT temperature reference signal 564. The diode controller 520 outputs a fourth limited maximum stator current ($I_{SL4}$) 584 based on the diode temperature 419 and a diode temperature reference signal 570. The rotor controller 512, the IGBT controller 516, and the diode controller 520 function substantially similar to the stator controller 508. The IGBT temperature 417 and the IGBT temperature reference signal 564 may be associated with one or more IGBTs of the inverter module 256 such as the IGBTs of the first leg, the second leg, or the third leg. Likewise, the diode temperature 419 and the diode temperature reference signal 570 may be associated with one or more diodes of the inverter module 256 such as the diodes of the first leg, the second leg, or the third leg.

The second multiplexor 528 determines, based on the rotor temperature 414, whether to input the second limited maximum stator current ($I_{SL2}$) 576 or the predetermined maximum stator current ($I_{S\_MAX}$) 548 to the minimum value selector 504. The third multiplexor 532 determines, based on the IGBT temperature 417, whether to input the third limited maximum stator current ($I_{SL3}$) 580 or the predetermined maximum stator current ($I_{S\_MAX}$) 548 to the minimum value selector 504. The fourth multiplexor 536 determines, based on the diode temperature 419, whether to input the fourth limited maximum stator current ($I_{SL4}$) 584 or the predetermined maximum stator current ($I_{S\_MAX}$) 548 to the minimum value selector 504.

The minimum value selector 504 outputs a maximum stator current ($I_{MAX\_STATOR}$) 412 corresponding to the minimum value of the first multiplexor 524, the second multiplexor 528, the third multiplexor 532, and the fourth multiplexor 536. In this manner, the minimum value selector 504 is able to minimize the effects of temperate derating.

Figure 7:
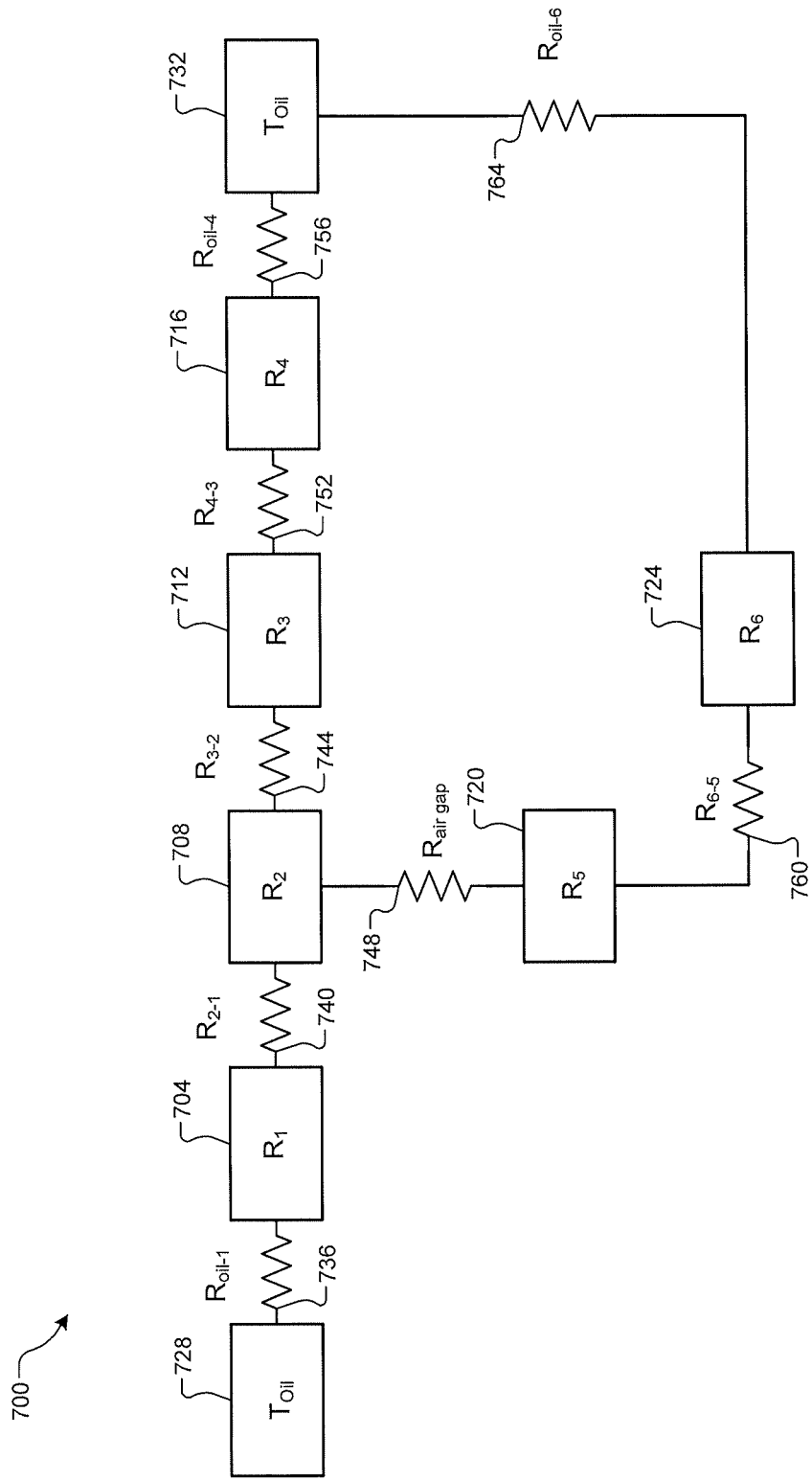
FIG. 7 is a schematic diagram of an example thermal model of a motor.

FIG. 7 is a schematic diagram of an example thermal model of the motor 198. An example of such thermal model may be found in commonly assigned U.S. Pat. No. 8,482,237, which is incorporated herein in its entirety. The power margin module 626 calculates the first feed-forward stator current ($I_{SFF1}$) 662 and a second feed-forward stator current based on a thermal model. As illustrated, a thermal model 700 includes eight nodes representing the temperature of various regions of the motor 198 given certain operating conditions and boundary conditions of one or more components of the vehicle. However, more or fewer regions of the motor 198 and/or boundary conditions may be considered to estimate the temperature of the motor 198.

Some of the nodes in the thermal model 700 may represent regions of the stator and other nodes may represent regions of the rotor, and a temperature may be assigned to each node. That is, a first stator node 704 may represent the temperature at a non-flux producing region of the stator (e.g., a stator iron). A second stator node 708 may represent the temperature at a flux producing region of the stator.

A third stator node 712 may represent the temperature of the copper used in the windings of the stator, such as the copper disposed between slots defined by the stator. A fourth stator node 716 may represent the temperature of the end turns of the copper used in the windings of the stator. A first rotor node 720 may represent the temperature from the permanent magnets used by the rotor. A second rotor node 724 may represent the temperature from a non-flux producing region of the rotor (e.g., a rotor iron).

The thermal model 700 may further include additional nodes that represent various other regions of interest of the motor 198 independent of the stator 1 and the rotor. For instance, some nodes may represent the temperature of the oil used in the motor 198. In one example implementation, a first oil node 728 may represent the temperature of the oil in one region of the motor 198 and a second oil node 732 may represent the temperature of the oil in another region of the motor 198.

Each of the nodes in the thermal model 700 may be connected to at least one other node by one or more heat transfer paths. The thermal model 700 may, therefore, include thermal resistances representing the heat transfer paths between the nodes. For instance, a first thermal resistance ($R_{oil-1}$) 736 may represent convective external heat transfer between the regions represented by the first oil node 728 and the first stator node 704.

A second thermal resistance ($R_{2-1}$) 740 may represent conduction between the regions represented by the first stator node 704 and the second stator node 708 via, e.g., the stator stack. A third thermal resistance ($R_{3-2}$) 744 may represent conduction between the regions represented by the second stator node 708 and the third stator node 712 via, e.g., the stator stack, copper windings, and an insulation system. A fourth thermal resistance ($R_{air\ gap}$) 748 may represent heat transfer through, e.g., an air gap between the regions represented by the second stator node 708 and the first rotor node 720.

A fifth thermal resistance ($R_{4-3}$) 752 may represent conduction through copper windings between the regions represented by the third stator node 712 and the fourth stator node 716. A sixth thermal resistance ($R_{oil-4}$) 756 may represent convection between the regions represented by the fourth stator node 716 and the second oil node 732, e.g., from the oil to the end turns of the stator. A seventh thermal resistance ($R_{6-5}$) 760 may represent conduction through the rotor core between the regions represented by the first rotor node 720 and the second rotor node 724. An eighth thermal resistance 764 may represent the heat transfer path between the second rotor node 724 and the second oil node 732 caused by convection from the oil to the hub of the rotor ($R_{oil-6}$).

Based on the thermal model described above, the thermal resistances for $R_1$, $R_2$, $R_3$, $R_4$ and $R_5$ can be determined as follows:

$R_1 = R_{oil-1} + R_{2-1}$ $R_2 = R_{oil-4} + R_{4-3}$ $R_3 = R_{3-2}$ $R_4 = R_{air\ gap} + R_{6-5}$ $R_5 = R_{oil-6}$ The power margin module 626 uses $R_1, R_2, R_3, R_4$ and $R_5$ to determine the first feed-forward stator current ($I_{SFF1}$) 662 and the second feed-forward stator current. For example, the first feed-forward stator current ($I_{SFF1}$) 662 may be determined based on or equal to:

$$\sqrt{\frac{P_{d,stator}}{1.5\ R_s}}$$

where $P_{d,stator}$ 629 is equal to:

$$\frac{T_{ref\_stator} - T_{oil}}{R_{\theta\_Stator}}$$

where $T_{Oil}$ represents the temperature of the oil in one region of the motor 198 such as at the first oil node or the second oil node, and $T_{ref\_stator}$ is a predetermined temperature reference of the stator and $R_{\theta stator}$ is equal to:

$R_2 \| \{[(R_4 + R_5) \| R_1] + R_3\}$

A power module of the rotor controller 512 determines the second feed-forward current based on one or more equations and look-up tables that relate power dissipated by the rotor ($P_{d,rotor}$) and a speed of the rotor ($\omega_r$) to the second feed-forward current. The power module may determine the power dissipated by the rotor ($P_{d,rotor}$) based on or equal to:

$$\frac{T_{ref\_rotor} - T_{oil}}{R_{\theta\_rotor}}$$

where $T_{Oil}$ represents the temperature of the oil in one region of the motor 198 such as at the first oil node or the second oil node 732, and $T_{ref\_rotor}$ is a predetermined temperature reference of the rotor and $R_{\theta\_rotor}$ is equal to:

$R_5 \| \{R_4 + [R_1] \| (R_2 + R_3)\}$

Referring to back to FIG. 5, a power margin module of the IGBT controller 516 and a power margin module of the diode controller 520 calculate a third feed-forward current and a fourth feed-forward current based on an IGBT conduction and switching loss and a diode conduction and switching loss, respectively. An example of such model of determining an IGBT/diode conduction and switching loss may be found in commonly assigned U.S. Pat. No. 7,755,313, which is incorporated herein in its entirety. For example, the third feed-forward current may be based on the following second-degree polynomial equation:

$\alpha_{igbt} I^2 + \beta_{igbt} I + \gamma_{igbt} = 0$ where I is solved for using a quadratic equation, $\gamma_{igbt}$ is equal to the power dissipated by the IGBT, $\alpha_{igbt}$ is based on or set equal to:

$$\frac{R_{Ton} I^2}{8} \left(1 + \frac{8}{3\pi} M_1 \cos\varphi \right)$$

β is based on or set equal to:

$$\frac{V_{ce}I}{2\pi}\left(1 + \frac{\pi}{4}M_1\cos\varphi\right) + \frac{E_{SW}f_{sw}}{\pi}SLF$$

where $R_{Ton}$ is the turn-on resistance of the IGBT, I is the peak amplitude of the current flowing through the inverter, $M_1$ represents the modulation index normalized by half of the DC voltage supply, $V_{ce}$ represents the common to emitter voltage, $E_{SW}f_{sw}$ is the switching energy and SLF is the switching load function.

The power margin module 626 of the diode controller 520 calculates the fourth feed-forward current based on diode conduction and switching loss. For example, the fourth feed-forward current may be based on the following second-degree polynomial equation:

$$\alpha_{diode}I^2 + \beta_{diode}I + \gamma_{diode} = 0$$

where I is solved for using a quadratic equation, $\gamma_{diode}$ is equal to the power dissipated by the diode, $\alpha_{diode}$ is based on or set equal to:

$$\frac{R_{Don}I^2}{8}\left(1 - \frac{8}{3\pi}M_1\cos\varphi\right)$$

$\beta_{diode}$ is based on or set equal to:

$$\frac{V_{DO}}{2\pi}\left(1 - \frac{\pi}{4}M_1\cos\varphi\right) + \frac{E_{rr}f_{sw}}{\pi}SLF$$

where $R_{Don}$ is the turn-on voltage of the diode, I is the peak amplitude of the current flowing through the inverter, $M_1$ represents the modulation index normalized by half of the DC voltage supply, $E_{rr}f_{sw}$ is the reverse recovery energy of the diode, and SLF is the switching load function.

Figure 8:
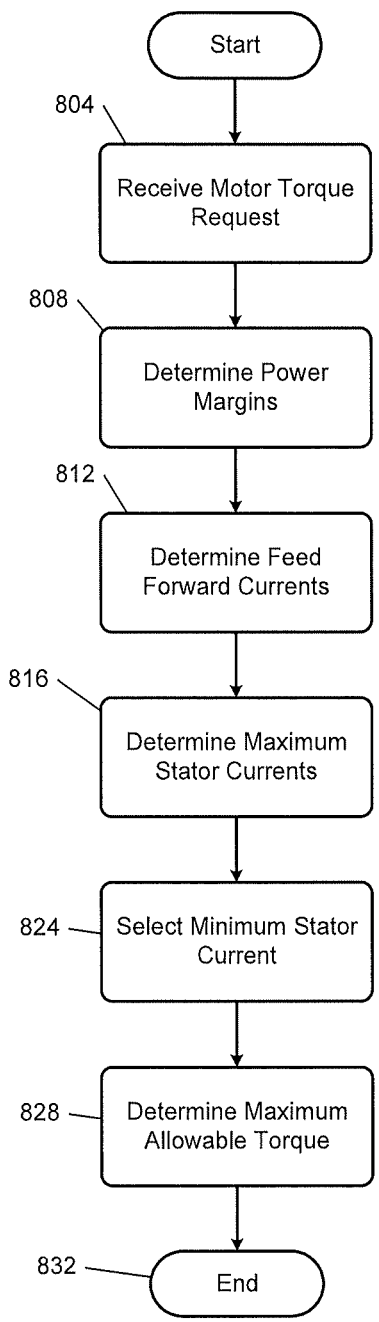
FIG. 8 is a flowchart of an example method of determining a maximum allowable torque.

FIG. 8 is a flowchart depicting an example method of determining the maximum allowable torque based on the stator temperature 415, the rotor temperature 414, the IGBT temperature 417, and the diode temperature 419. At 804, control receives the motor torque request 234 and control continues at 808. At 808, control determines a power margin for each of the stator controller 508, the rotor controller 512, the IGBT controller 516, and the diode controller 520. At 812, control determines a feed-forward current for each controller and control continues at 816.

At 816, control determines the limited maximum stator currents ($I_{SL1}$, $I_{SL2}$, $I_{SL3}$, and $I_{SL4}$) 572, 576, 580, and 584 based on the feed-forward currents. At 824, control selects a lowest value of the limited maximum stator currents ($I_{SL1}$, $I_{SL2}$, $I_{SL3}$, and $I_{SL4}$) 572, 576, 580, and 584 as the maximum stator current ($I_{MAX\_STATOR}$) 412 and control continues at 828. At 828, control determines the maximum torque based on the maximum stator current ($I_{MAX\_STATOR}$) 412 and control ends at 832.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional circuits, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An electric motor control system of a vehicle, comprising:
   a temperature module configured to, based on a motor torque request for an electric motor of the vehicle, (i) determine a plurality of stator current values based on a plurality of temperatures and (ii) generate a maximum stator current based on a lowest value of the plurality of stator current values;
   a torque module configured to, based on the maximum stator current, the motor torque request, and a maximum allowable flux, generate a maximum torque output;
   a current command module configured to, based on a speed of a rotor of the electric motor and the maximum torque output, generate a d-axis current adjustment and a q-axis current adjustment; and
   a switching control module configured to, based on the d-axis current adjustment and the q-axis current adjustment, control switching of an inverter module and apply power to stator windings of the electric motor from an energy storage device,
   wherein the plurality of temperatures correspond to at least one temperature associated with the electric motor and at least one temperature associated with the inverter module.

2. The electric motor control system of claim 1 wherein:
   the temperature module includes a plurality of controllers; and
   each of the plurality of controllers includes:
      a temperature error module configured to output an error signal corresponding to a difference between a temperature reference and a measured temperature; and
      a proportional integral module, connected to the temperature error module, configured to output a first signal and a second signal,
      wherein the first signal is a first multiplication product of the error signal and the second signal is based on at least one of an integral of the error signal and a second multiplication product of the error signal.

3. The electric motor control system of claim 2 wherein each of the plurality of controllers further includes a feed-forward module, connected to the proportional integral module, that outputs the maximum stator current based on the first signal, the second signal, and a feed-forward current value.

4. The electric motor control system of claim 3 wherein each of the plurality of controllers includes a limiting module, to which an output of the feed-forward module is input, configured to:
   in response to the maximum stator current being greater than a first predetermined current, output the first predetermined current; and
   in response to the maximum stator current being less than the first predetermined current, output the maximum stator current,
   wherein the first predetermined current is less than the maximum stator current.

5. The electric motor control system of claim 4 wherein:
   the proportional integral module includes a proportional portion and an integral portion;
   each of the plurality of controllers includes a comparison module configured to determine a difference between an output of the limiting module and an input of the limiting module;
   in response to the difference not being equal to a first predetermined value, setting an input to the integral portion to a second predetermined value; and in response to the difference being equal to the first predetermined value, setting the input to the integral portion to the difference between the temperature reference and the measured temperature.

6. The electric motor control system of claim 5 wherein:
the at least one temperature associated with the electric motor is at least one of a temperature of the rotor and a temperature of the stator windings of the electric motor; and
the plurality of controllers includes a stator controller, a rotor controller, a diode controller, and an IGBT controller.

7. The electric motor control system of claim 6 wherein the feed-forward current value is set by a power margin module that determines the feed-forward current value based on a thermal model of the electric motor.

8. The electric motor control system of claim 6 wherein:
the inverter module includes at least one diode and at least one insulated gate bipolar transistor; and
the at least one temperature associated with the inverter module is associated with the at least one diode.

9. The electric motor control system of claim 8 the feed-forward current value is based on a switching loss of the at least one diode and a conduction loss of the at least one diode.

10. The electric motor control system of claim 8 wherein:
the at least one temperature associated with the inverter module is associated with the at least one insulated gate bipolar transistor; and
the feed-forward current value is based on a switching loss of the at least one insulated gate bipolar transistor and a conduction loss of the at least one insulated gate bipolar transistor.

11. An electric motor control method for a vehicle, the method comprising:
in response to receiving a motor torque request for an electric motor of the vehicle:
determining, with a temperature module, a plurality of stator current values based on a plurality of temperatures; and
generating, with the temperature module, a maximum stator current based on a lowest value of the plurality of stator current values;
generating, with a torque module, a maximum torque output based on the maximum stator current, the motor torque request, and a maximum allowable flux;
generating, with a current command module, a d-axis current adjustment and a q-axis current adjustment based on a speed of a rotor of the electric motor and the maximum torque output; and
controlling, with a switching control module, switching of an inverter module and applying power to stator windings of the electric motor from an energy storage device,
wherein the plurality of temperatures correspond to at least one temperature associated with the electric motor and at least one temperature associated with the inverter module.

12. The electric motor control method of claim 11 wherein the temperature module includes a plurality of controllers and determining the plurality of stator current values includes:
generating, for each of the plurality of controllers, an error signal corresponding to a difference between a temperature reference and a measured temperature; and
generating, for each of the plurality of controllers, a first signal and a second signal,
wherein the first signal is a first multiplication product of the error signal and the second signal is based on at least one of an integral of the error signal and a second multiplication product of the error signal.

13. The electric motor control method of claim 12 wherein determining the plurality of stator current values includes:
generating, for each of the plurality of controllers, a feed-forward current value; and
generating, for each of the plurality of controllers, the maximum stator current based on the first signal, the second signal, and the feed-forward current value.

14. The electric motor control method of claim 13 wherein each of the plurality of controllers includes a limiting module and determining the plurality of stator current values includes:
outputting, for each of the plurality of controllers, a first predetermined current in response to the maximum stator current being greater than the first predetermined current; and
outputting, for each of the plurality of controllers, the maximum stator current in response to the maximum stator current being less than the first predetermined current,
wherein the first predetermined current is less than the maximum stator current.

15. The electric motor control method of claim 14 wherein determining the plurality of stator current values includes:
determining, for each of the plurality of controllers, a difference between an output of the controller and the maximum stator current;
in response to the difference not being equal to a first predetermined value, setting an input to an integral portion of each of the plurality of controllers to a second predetermined value; and
in response to the difference being equal to the first predetermined value, setting the input to the integral portion of each of the plurality of controllers to the difference between the temperature reference and the measured temperature.

16. The electric motor control method of claim 15 wherein the at least one temperature associated with the electric motor is at least one of a temperature of the rotor and a temperature of the stator windings of the electric motor.

17. The electric motor control method of claim 16 wherein the feed-forward current value is based on a thermal model of the electric motor.

18. The electric motor control method of claim 16 wherein:
the inverter module includes at least one diode and at least one insulated gate bipolar transistor; and
the at least one temperature associated with the inverter module is associated with the at least one diode.

19. The electric motor control method of claim 18 the feed-forward current value is based on a switching loss of the at least one diode and a conduction loss of the at least one diode.

20. The electric motor control method of claim 18 wherein:
the at least one temperature associated with the inverter module is associated with the at least one insulated gate bipolar transistor; and
the feed-forward current value is based on a switching loss of the at least one insulated gate bipolar transistor and a conduction loss of the at least one insulated gate bipolar transistor.

* * * * *